US012287227B2

(12) United States Patent
Rutkowski et al.

(10) Patent No.: US 12,287,227 B2
(45) Date of Patent: Apr. 29, 2025

(54) SYSTEMS, APPARATUS, AND RELATED METHODS FOR VEHICLE SENSOR CALIBRATION

(71) Applicant: Ford Global Technologies, LLC, Dearborn, MI (US)

(72) Inventors: Brian D. Rutkowski, Ypsilanti, MI (US); David John Rutkowski, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 17/885,340

(22) Filed: Aug. 10, 2022

(65) Prior Publication Data

US 2024/0053175 A1 Feb. 15, 2024

(51) Int. Cl.
*G01D 18/00* (2006.01)
*B60W 50/00* (2006.01)

(52) U.S. Cl.
CPC ............. *G01D 18/00* (2013.01); *B60W 50/00* (2013.01); *B60W 2050/0088* (2013.01)

(58) Field of Classification Search
CPC .......... B60W 50/00; B60W 2050/0088; G01D 18/00
See application file for complete search history.

(56) References Cited

U.S. PATENT DOCUMENTS

| 4,953,305 | A | * | 9/1990 | Van Lente | G01C 17/38 700/79 |
| 5,426,416 | A | * | 6/1995 | Jefferies | G01R 15/146 340/657 |
| 7,774,038 | B2 | * | 8/2010 | Wang | A61B 5/1473 205/792 |
| 8,125,239 | B2 | | 2/2012 | Rittmann | |
| 8,548,671 | B2 | * | 10/2013 | Wong | G01C 25/00 701/29.7 |
| 9,300,360 | B2 | | 3/2016 | Hourne | |
| 10,259,469 | B2 | | 4/2019 | Miloser et al. | |

FOREIGN PATENT DOCUMENTS

CN 112816222 A 5/2021

* cited by examiner

*Primary Examiner* — Elias Desta
(74) *Attorney, Agent, or Firm* — Lorne Forsythe; Hanley, Flight & Zimmerman, LLC

(57) ABSTRACT

Systems, apparatus, and related methods for vehicle sensor calibration are disclosed. An example vehicle includes a sensor including an output; sensor interface circuitry including a transistor, the sensor interface circuitry communicatively coupled to the output; and processor circuitry communicatively coupled to the sensor via the sensor interface circuitry. The processor circuitry is to cause the transistor to activate to electrically couple the output to one of (a) a ground potential or (b) a voltage source associated with a voltage different than a voltage corresponding to an output voltage range of the sensor; and cause a code to be transmitted to the sensor. The sensor is to perform a calibration in response to the electrical coupling of the output to the ground potential or the voltage source and receipt of the code.

20 Claims, 11 Drawing Sheets

SYSTEMS, APPARATUS, AND RELATED METHODS FOR VEHICLE SENSOR CALIBRATION

FIELD OF THE DISCLOSURE

This disclosure relates generally to vehicles and, more particularly, to systems, apparatus, and related methods for vehicle sensor calibration.

BACKGROUND

A vehicle such as a car or truck includes sensors such as strain sensors, position sensors, and pressure sensors. The sensors can be calibrated during manufacture of the vehicle.

SUMMARY

An example vehicle includes a sensor including an output; sensor interface circuitry including a transistor, the sensor interface circuitry communicatively coupled to the output; and processor circuitry communicatively coupled to the sensor via the sensor interface circuitry. The processor circuitry is to cause the transistor to activate to electrically couple the output to one of (a) a ground potential or (b) a voltage source associated with a voltage different than a voltage corresponding to an output voltage range of the sensor; and cause a code to be transmitted to the sensor. The sensor is to perform a calibration in response to the electrical coupling of the output to ground and receipt of the code.

An example apparatus to cause a sensor to perform a calibration includes sensor interface circuitry communicatively coupled to the sensor via an output of the sensor; at least one memory; machine readable instructions; and processor circuitry to at least one of instantiate or execute the machine readable instructions to cause the output of the sensor to electrically connect to a first voltage, the first voltage having a value outside of an output voltage range of the sensor; cause a calibration command to be transmitted to the sensor via the sensor interface circuitry; and verify that the calibration has been performed in response to a signal from the sensor.

An example system includes sensor calibration control circuitry to cause an output of a sensor to electrically couple to a first voltage different than a voltage defining an output sensor range of the sensor; cause a first code to be transmitted to the sensor; and calibration performance circuitry to detect the first voltage of the output; identify the first code; and in response to the detection of the first voltage of the output and the identification of the first code, cause a calibration to be performed at the sensor.

BRIEF DESCRIPTION OF THE DRAWINGS

In general, the same reference numbers will be used throughout the drawing(s) and accompanying written description to refer to the same or like parts. The figures are not to scale.

Figure 1:
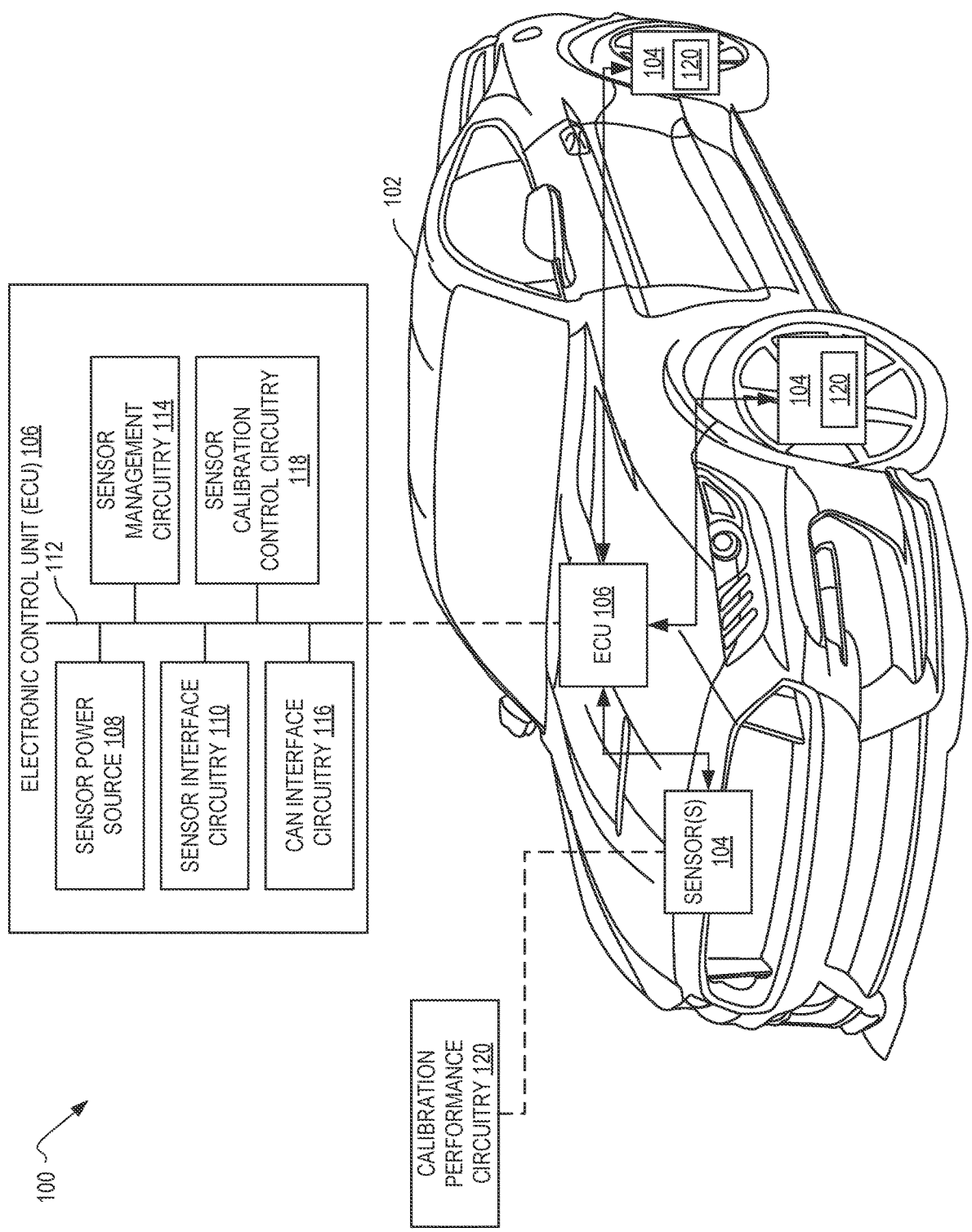
FIG. 1 illustrates an example system constructed in accordance with teachings of this disclosure including a vehicle, an electronic control unit (ECU) of the vehicle, and one or more sensors of the vehicle.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A vehicle such as a car or truck includes sensors such as strain sensors, position sensors, and pressure sensors. For instance, data associated with signals output by a strain sensor can be used to measure a load supported by wheels of a vehicle. To provide for accurate measurements during operation of the vehicle, the sensors are calibrated for each vehicle. A sensor may be calibrated during the vehicle assembly process. For instance, a strain sensor may be calibrated in an unloaded position during manufacture of the vehicle.

Over the life of the vehicle, the sensor may need to be replaced. However, when the sensor is replaced after assembly of the vehicle, the replacement sensor may be subject to different conditions and/or variables than the original sensor. Such changes can affect the accuracy of measurements determined from the signals output by the replacement sensor. For instance, when a strain sensor is replaced, factors such as exposure of the replacement sensor to stress (e.g., torque) when the sensor is coupled to the vehicle suspension; a property of the surface to which the replacement sensor is coupled (e.g., a flatness of the surface); and/or a weight of other components of the suspension system can affect measurements generated by the replacement sensor. Thus, the replacement sensor should be calibrated to account for such variables.

Some known methods to calibrate a sensor in an assembled vehicle include establishing a bi-directional communicative coupling between the sensor and a controller area network (CAN) of the vehicle. In such methods, the CAN may transmit instructions to the sensor to cause a calibration to be performed. Some known methods to calibrate a sensor in an assembled vehicle include adding a dedicated pin to the sensor to communicatively couple the sensor to a wiring harness of the vehicle to enable the sensor to receive calibration requests. However, such known methods can result in increased complexity of the vehicle due to the establishments of additional communication pathways.

Examples disclosed herein provide for calibration of a sensor after assembly to a vehicle using an existing interface between the sensor and the electronic control unit (ECU) of the vehicle. An example sensor interface disclosed herein includes a low pass filter to receive signals transmitted via an output (e.g., a line, a wire, a pin) of the sensor and a switch that is selectively activated to initiate calibration of the sensor. The switch can include a transistor. In examples disclosed herein, the vehicle ECU instructs or otherwise causes the transistor to turn on, which affects the output of the sensor. In some examples, activation of the transistor causes the sensor output to be electrically coupled to a ground potential (i.e., grounded). When the sensor is powered on, the sensor detects that the output is grounded. In response, the sensor waits for the ECU to send a calibration code or command. In examples disclosed herein, the sensor preforms the calibration in response to identifying the code from the ECU. Thus, in examples disclosed herein, transmission of the calibration code from the ECU to the sensor in connection with grounding of the sensor output causes calibration of the sensor to be performed when the sensor is assembled in the vehicle.

Examples disclosed herein use established connections between the sensor and the ECU (e.g., the sensor output, the sensor interface circuitry) to initiate calibration at the sensor. Rather than adding, for instance, a dedicated pin at the sensor to receive calibration commands or establish a CAN communication channel, examples disclosed herein include a transistor in the sensor interface circuitry that affects the pathway of the sensor output (e.g., switches the output to ground). Also, when the transistor is activated, the calibration command can be transmitted to the sensor via the sensor output, thereby providing for bi-directional communication with the sensor without substantially increasing the complexity of the sensor interface. Further, the combination of the both the grounded output and the calibration code provides for robust verification by the sensor that the calibration should be performed.

FIG. 1 illustrates an example system 100 including a vehicle 102 in accordance with teachings of this disclosure. Although in the example of FIG. 1, the vehicle 102 is a car, the vehicle 102 could include other types of vehicles (e.g., a van, a truck, etc.)

The example vehicle 102 includes sensors 104 to output signals that may have values corresponding to a current, voltage, resistance, etc. The signals output by the sensors 104 can be analyzed to determine conditions at the vehicle 102. The sensors 104 can include, for example, strain sensors to detect a load on the vehicle 102, position sensors to detect an angle of input at a steering wheel of the vehicle 102, crankshaft position sensors, tire pressure sensors, level sensors to monitor levels of fluid such as oil or coolant in the vehicle 102, temperature sensors, etc. The sensors 104 can include other types of sensors. The sensors 104 can include analog sensors and/or digital sensors. Also, the sensors 104 can be located at different locations in the vehicle 102 than represented in FIG. 1.

The signals output by the sensors 104 are analyzed by one or more electronic control units (ECUs) 106 of the vehicle 102. The ECU(s) 106 control electrical systems and/or subsystems of the vehicle 102 based on the sensor signals and/or data derived therefrom. As illustrated in FIG. 1, the vehicle 102 includes an ECU 106 in communication with the sensors 104. The vehicle 102 can include additional ECUs 106 communicatively coupled to the (e.g., first) ECU 106 in FIG. 1 via a controller area network (CAN).

In the example of FIG. 1, the ECU 106 includes a sensor power source 108 to provide power (e.g., voltage) to a respective sensor 104 in communication with the ECU 106. The ECU 106 includes sensor interface circuitry 110 to monitor an output (e.g., an output line) of each sensor 104 in communication with the ECU 106. The output of each sensor 104 communicatively couples the sensor 104 and the ECU 106. The sensor(s) 104 output signals that are received by the ECU 106 via the corresponding sensor output. As disclosed herein, the sensor interface circuitry 110 of the example ECU 106 of FIG. 1 also facilitates calibration of the sensor 104 by causing the output that electrically and/or communicatively couples a respective sensor 104 and the ECU 106 to be grounded (e.g., drop to zero volts). As disclosed herein, switching the output of the sensor to ground serves as an indicator that the sensor 104 should perform a calibration.

The ECU 106 includes sensor management circuitry 114. The sensor management circuitry 114 outputs instructions to, for instance, cause the sensor power source 108 to provide power to the sensor 104. In the example of FIG. 1, the sensor management circuitry 114 receives analog signals output by the respective sensors 104. The sensor management circuitry 114 can process and/or analyze the sensor output signals (e.g., convert analog signals to digital signals, determine properties such as vehicle, load, tire pressure, temperature, based on the signals, etc.). In other examples, the sensor management circuitry 114 transmits the sensor outputs (e.g., the raw data or the corresponding digital signals) for further processing and/or analysis by other ECUs of the vehicle 102. The example ECU 106 of FIG. 1 includes controller area network (CAN) interface circuitry 116 to interface with other ECUs of the vehicle 102. In the example of FIG. 1, the sensor power source 108, the sensor interface circuitry 110, the CAN interface circuitry 116, and the sensor management circuitry 114 are communicatively coupled via a bus 112.

In the example of FIG. 1, the ECU 106 includes sensor calibration control circuitry 118. In some examples, the sensor calibration control circuitry 118 receives instructions via, for instance, the CAN interface circuitry 116 indicating that one or more of the sensors 104 of the vehicle 102 should be calibrated. To cause the sensor 104 to perform a calibration when assembled in the vehicle 102, the sensor calibration control circuitry 118 generates instructions for the output of the sensor 104 to be switched or shorted to a ground potential (i.e., electrically coupling the sensor output to a ground potential) by causing a transistor of the sensor interface circuitry 110 to turn on and electrically connect the sensor output to ground. The sensor calibration control circuitry 118 also causes a calibration command or code to be transmitted to the sensor 104.

In the example of FIG. 1, the sensors 104 include calibration performance circuitry 120. As disclosed herein, the calibration performance circuitry 120 recognizes that the sensor output (e.g., the output line) that electrically couples the sensor 104 to the ECU 106 is grounded. The calibration performance circuitry 120 also recognizes the calibration command from the sensor calibration control circuitry 118. In response to detecting that the sensor output is grounded and the receipt of the calibration command or code, the calibration performance circuitry 120 causes the sensor 104 to perform a calibration.

The sensor calibration control circuitry 118 generates instructions to cause the transistor of the sensor interface circuitry 110 to turn off or deactivate after a period of time (e.g., 1 second). The calibration performance circuitry 120 causes a code or a signal indicative of measurements obtained during the calibration (e.g., strain) to be output for transmission to the sensor calibration control circuitry 118 via the output to indicate that the calibration is complete.

Although in the example of FIG. 1 the sensor calibration control circuitry 118 is shown as implemented by the ECU 106 of the vehicle 102, in some examples, one or more components of the sensor calibration control circuitry 118 could be implemented by, for example, one or more cloud-based devices (e.g., one or more server(s), processor(s), and/or virtual machine(s)) in communication with the ECU 106. Also, although in the example of FIG. 1, the calibration performance circuitry 120 is shown as implemented by the sensor 104 of the vehicle 102, in some examples, one or more components of the calibration performance circuitry 120 could be implemented by, for example, one or more cloud-based devices (e.g., one or more server(s), processor(s), and/or virtual machine(s)) in communication with the sensor 104.

Figure 2:
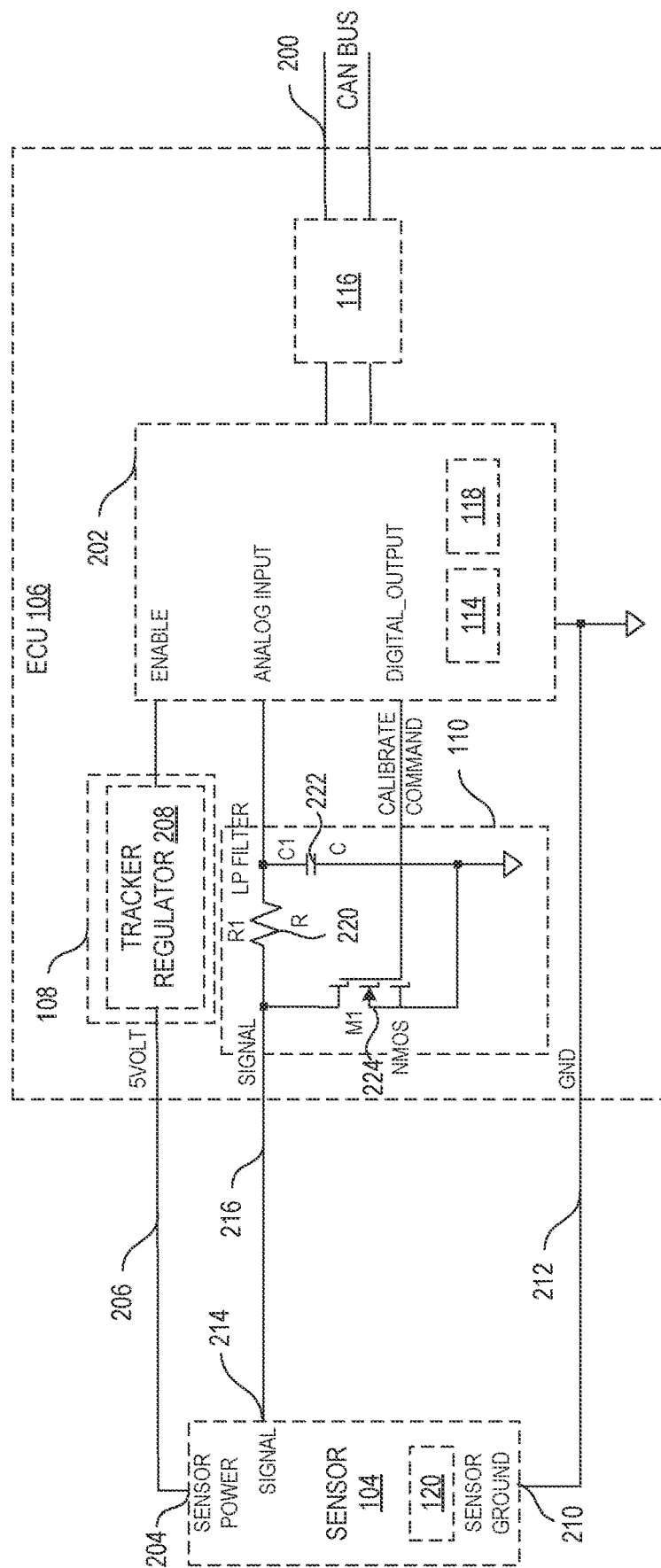
FIG. 2 is a circuit diagram of an example implementation of the ECU and one of the example sensors of the vehicle of FIG. 1 in accordance with teachings of this disclosure.

FIG. 2 is a circuit diagram of an example implementation of the ECU 106 and one of the example sensors 104 of the vehicle 102 of FIG. 1. As disclosed in connection with FIG. 1, the ECU 106 includes the CAN interface circuitry 116. The CAN interface circuitry 116 facilitates communication with, for instance, other ECUs of the vehicle 102 via a CAN bus 200. In the example of FIG. 2, the CAN interface circuitry 116 transmits instructions received from other ECUs via the CAN bus 200 to the sensor management circuitry 114 and/or the sensor calibration control circuitry 118. In the example of FIG. 1, the sensor management circuitry 114 and the sensor calibration control circuitry 118 are implemented by processor circuitry 202 of the ECU 106.

As illustrated in FIG. 2, the sensor 104 includes a first electrical connection 204 (e.g., a pin, a wire). The first electrical connection 204 of the sensor 104 is communicatively coupled to the sensor power source 108 of the ECU 106 via a power line 206 or other electrical connection. The power line 206 provides power inputs (e.g., voltage) to the sensor 104. The example sensor power source 108 of FIG. 2 includes a voltage regulator 208 (e.g., a tracker regulator) to maintain a constant voltage of the power provided to the sensor 104. The sensor 104 includes a second electrical connection 210. The second electrical connection 210 of the sensor 104 is coupled to ground via a ground connection 212 as shown in FIG. 2.

The example sensor 104 of FIG. 1 includes a third electrical connection 214. The third electrical connection 214 is communicatively coupled to the ECU 106 (e.g., the sensor interface circuitry 110) via an output 216 (e.g., a line, a wire, a pin, or other electrical connection). The sensor 104 transmits signals indicative of values measured by the sensor 104 to the ECU 106 via the output 216. The output 216 is communicatively coupled to the sensor interface circuitry 110, which receives the signals output by the sensor 104.

In the example of FIG. 2, the sensor interface circuitry 110 includes a low pass filter including a resistor 220 and a capacitor 222. The low pass filter is between the third electrical connection 214 and an analog input port 223 that provides the raw signals to the sensor management circuitry 114 for further processing and/or analysis. The signals output by the sensor 104 via the output 216 are filtered by the low pass filter of the sensor interface circuitry 110 prior to access by, for instance, the sensor management circuitry 114 of the ECU 106.

In the example of FIG. 2, the sensor interface circuitry 110 includes a switch to electrically couple the output 216 to a ground potential. In the example of FIG. 2, the switch is a transistor 224. The transistor 224 can include an N-channel MOSFET (NMOS) transistor. However, other types of transistors could be used. Also, other types of switches could be used, such as a relay or other electromechanical device that could electrically couple the output to a ground potential. As disclosed herein, the transistor 224 facilities calibration of the sensor 104.

In the example of FIG. 2, the sensor 104 can be assembled in the vehicle 102 to replace another sensor during the life of the vehicle 102 (e.g., another strain sensor). Thus, the replacement sensor 104 should be calibrated to obtain accurate measurements from the sensor 104 in view of conditions at the vehicle 102 that may affect the sensor 104 (e.g., the effects of torque on the sensor 104).

When the sensor 104 is initially assembled in the vehicle 102 of FIG. 1, the sensor 104 is in a powered-off state. To initiate calibration of the sensor 104, the sensor calibration control circuitry 118 generates an instruction to cause the transistor 224 to activate or turn on (i.e., to act like a closed switch). When the transistor 224 is activated, the transistor 224 pulls or shorts the output 216 between the sensor 104 and the sensor interface circuitry 110 to ground. The sensor calibration control circuitry 118 can instruct the transistor 224 to short the output 216 for a threshold period of time, such as a one second. In other examples, the transistor 224 can cause the output 216 to switch to a positive voltage that is different from an output voltage range of the sensor 104. For instance, the sensor 104 can have an output voltage range of 0.5 to 4.5 volts and the transistor 224 can cause the output 216 to electrically couple to 5 volt source. In some examples, the transistor 224 can cause the output 216 to electrically couple to 12 volt source. After the transistor 224 has electrically connected the output 216 to ground (or, in other examples, a positive voltage such as, for instance, 5 volts or 12 volts), the sensor calibration control circuitry 118 generates an instruction to cause the sensor power source 108 to provide power to the sensor 104.

When the sensor 104 is in the powered-on state, the calibration performance circuitry 120 of the sensor 104 detects that the output 216 is electrically connected to ground (or, in other examples, a positive voltage such as 5 volts or 12 volts). For instance, the output voltage range of the sensor 104 can be 0.5 to 4.5 volts and, thus, the short to ground can be detected by the calibration performance circuitry 120. In response to detecting the ground voltage of the output 216, the calibration performance circuitry 120 monitors for receipt of a code or command from the sensor calibration control circuitry 118 within a threshold period of time. The sensor calibration control circuitry 118 generates and outputs a code, pattern, or command for transmission to the sensor 104 that serves as an indicator that the sensor 104 should perform a calibration.

As shown in FIG. 2, the calibration command (e.g., a digital output) is transmitted to the sensor 104 via a communication pathway defined between the processor circuitry 202 of the ECU 106 and the sensor 104. In the example of FIG. 2, the communication pathway includes the transistor 224, the output 216, and the third electrical connection 214 of the sensor 104. Thus, in the example of FIG. 2, the output 216 provides for bi-directional communication between the sensor 104 and the ECU 106. The code or command output by the sensor calibration control circuitry 118 can be, for example, a Manchester code. In some examples, a dedicated calibration code or command is assigned to each sensor 104 of the vehicle 102. In other examples, a common calibration code is used to initiate calibration at two or more of the sensors 104.

When the calibration performance circuitry 120 detects the code from the sensor calibration control circuitry 118, the calibration performance circuitry 120 recognizes that a calibration should be performed. The calibration performance circuitry 120 causes the sensor 104 to perform the calibration. Also, the sensor calibration control circuitry 118 instructs the transistor 224 to turn off. As a result, the output 216 of the sensor 104 is re-connected to the low pass filter (i.e., the resistor 220, the capacitor 222) of the sensor interface circuitry 110 for transmission of output signals from the sensor 104 to the ECU 106.

In some examples, the calibration performance circuitry 120 causes the sensor 104 to resend the code (e.g., the Manchester code) received from the sensor calibration control circuitry 118 via the output 216 to inform sensor calibration control circuitry 118 that the calibration of the sensor 104 is complete. In some examples, the sensor 104 sends a different code to indicate that the calibration is complete. In some examples, when the calibration of the sensor 104 is complete, the calibration performance circuitry 120 causes signals corresponding to the measurements (e.g., measured strain) performed by the sensor 104 during the calibration to be transmitted. Thus, in the example of FIG. 2, the output 216 and the associated third electrical connection 214 provide for bi-directionality with respect receiving the calibration code or command and transmitting signal outputs.

In some examples, if the calibration performance circuitry 120 does not detect the calibration code or command from the ECU 106 within a threshold period of time, the calibration performance circuitry 120 determines that the output 216 was not intentionally shorted to ground for purposes of initiating calibration at the sensor 104. Thus, the combination of the output 216 being electrically coupled to ground and the calibration code or pattern from the sensor calibration control circuitry 118 enables the calibration performance circuitry 120 of the sensor 104 to distinguish between calibration commands from the ECU 106 and other instances in which the output 216 may be shorted to ground (such as shorts originating from wiring contact to sheet metal or other wires in the automotive wiring harness).

In some examples, the sensor 104 is already powered on when the sensor calibration control circuitry 118 determines that the sensor 104 should be calibrated. In such examples, the calibration performance circuitry 120 can detect that an output voltage of the output 216 has switched to a ground voltage (e.g., from an output voltage range of 0.5 to 4.5 volts). In other examples, the calibration performance circuitry 120 can detect that the transistor 224 has caused the output 216 to switch to a positive voltage such as 5 volts. The calibration performance circuitry 120 monitors for a calibration command or code from the sensor calibration control circuitry 118 to initiate calibration.

Figure 3:
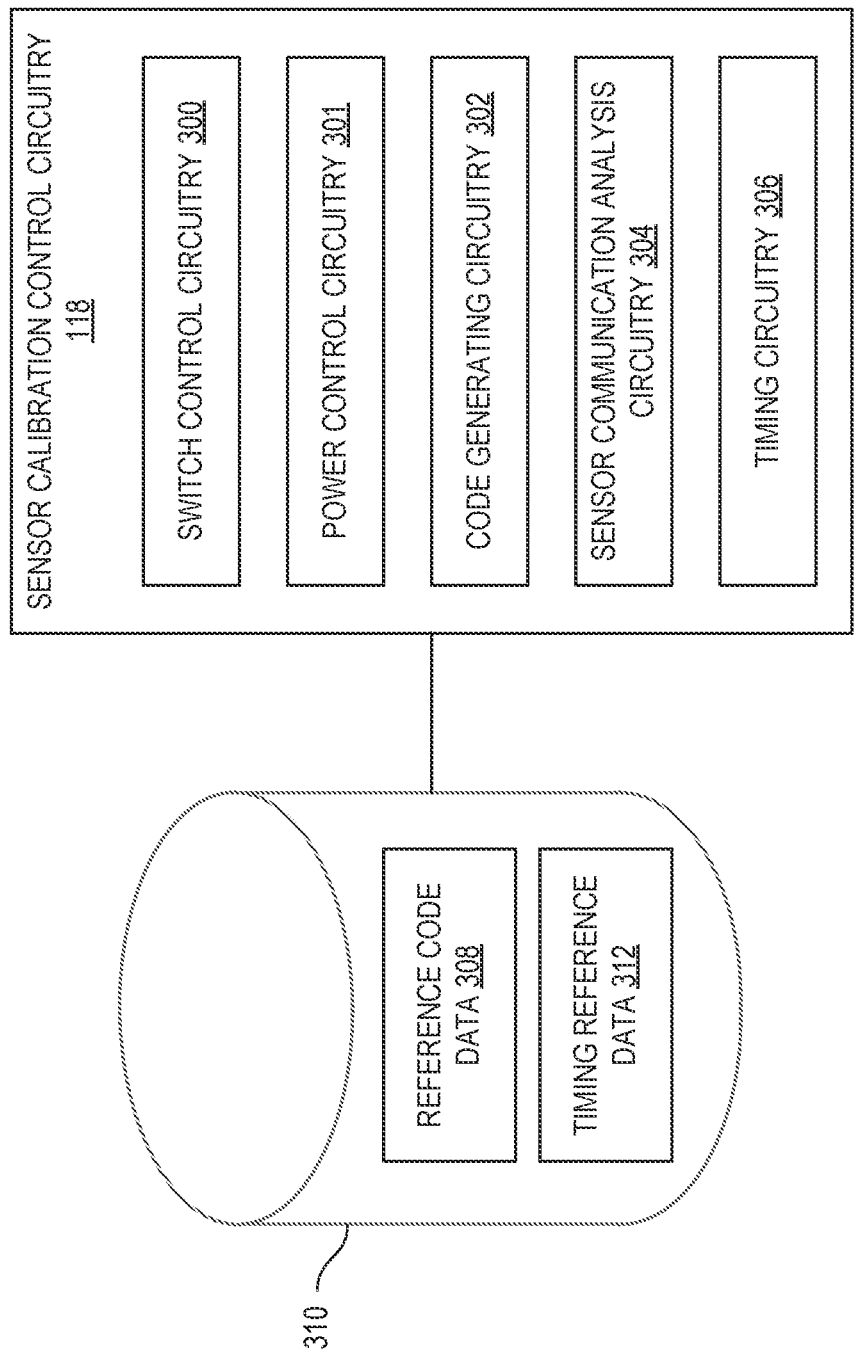
FIG. 3 is a block diagram of the example sensor calibration control circuitry of FIG. 1 in accordance with teachings of this disclosure.

FIG. 3 is a block diagram of the sensor calibration control circuitry 118 of FIGS. 1 and 2 to cause the sensor(s) 104 of FIGS. 1 and/or 2 to perform a calibration when assembled in the vehicle 102 of FIG. 1. The sensor calibration control circuitry 118 of FIG. 3 may be instantiated (e.g., creating an instance of, bring into being for any length of time, materialize, implement, etc.) by processor circuitry such as a central processing unit executing instructions. Additionally or alternatively, the sensor calibration control circuitry 118 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The example sensor calibration control circuitry 118 of FIG. 3 includes switch control circuitry 300, power control circuitry 301, code generating circuitry 302, sensor communication analysis circuitry 304, and timing circuitry 306.

The switch control circuitry 300 of the example sensor calibration control circuitry 118 of FIG. 3 generates instructions to cause the transistor 224 (or other type of switch) to turn on to affect (e.g., disrupt, short) the output 216 (e.g., an output line) of the sensor 104. In particular, the switch control circuitry 300 generates instructions for the transistor 224 to turn on in response to a request for the sensor 104 to be calibrated. The request can be received from, for instance, another ECU 106 via the CAN interface circuitry 116. As disclosed herein, when the switch control circuitry 300 causes the transistor 224 to turn on, the transistor 224 electrically connects the output 216 of the sensor 104 to ground.

The power control circuitry 301 of the example sensor calibration control circuitry 118 of FIG. 3 causes the sensor power source 108 to provide power to the sensor 104. In some examples, the sensor 104 is powered off when the switch control circuitry 300 causes the transistor 224 to turn on as part of the calibration initiation process. In such examples, the power control circuitry 301 instructs the sensor power source 108 to provide power to the sensor 104 to cause the sensor 104 to turn on and recognize that the output 216 is shorted to ground.

The code generating circuitry 302 of the example sensor calibration control circuitry 118 generates and outputs a code or command for transmission to the sensor 104. As disclosed herein, the calibration performance circuitry 120 of the sensor 104 interprets the code as an instruction to perform a calibration. The example code generating circuitry 302 of FIG. 3 can generate the code based on reference code data 308 stored in a database 310. In some examples, the sensor calibration control circuitry 118 includes the database 310. In some examples, the database 310 is located external to the sensor calibration control circuitry 118 in a location accessible to the sensor calibration control circuitry 118 as shown in FIG. 3.

The reference code data 308 can include code(s) to be sent to the sensor(s) 104 of the vehicle. The code(s) can include Manchester code(s) or other pattern(s) that serve as indicators to the calibration performance circuitry 120 of the respective sensors 104 that a calibration should be performed. In some examples, the reference code data 308 includes different codes for each sensor 104 of the vehicle 102. In some examples, the reference code data 308 includes different codes based on the type of sensor 104 that is to perform the calibration (e.g., a unique code for the strain sensors of the vehicle 102, a unique code for the pressure sensors of the vehicle 102). In some examples, the reference code data 308 includes a common code for two or more of the sensors regardless of sensor type (e.g., a common code that can be sent to any of the sensors 104 of the vehicle 102 to initiate calibration of the sensor(s) 104). The reference code data 308 can be defined based on user inputs.

The sensor communication analysis circuitry 304 of the example sensor calibration control circuitry 118 of FIG. 3 analyzes signals received from the sensor 104 after calibration has been initiated and/or completed. For example, the sensor communication analysis circuitry 304 can recognize that the calibration performance circuitry 120 of the sensor 104 has transmitted a code (e.g., a Manchester code) indicating that the calibration is complete. In some examples, the sensor communication analysis circuitry 304 recognizes that the calibration performance circuitry 120 has transmitted signals indicative of measurements collected during the calibration. The sensor communication analysis circuitry 304 can communicate with the sensor management circuitry 114 and/or other ECUs of the vehicle 102 (e.g., via the CAN interface circuitry 116) to inform sensor management circuitry 114 and/or the other ECUs 106 that the calibration has been completed.

The timing circuitry 306 of the example sensor calibration control circuitry 118 of FIG. 3 monitors a time for which the output 216 has been shorted to ground. In some examples, the switch control circuitry 300 instructs the transistor 224 to turn off after a threshold period of time as monitored by the timing circuitry 306. In some examples, the switch control circuitry 300 instructs the transistor 224 to turn off after confirmation from the code generating circuitry 302 that the code has been transmitted to the sensor 104. Timing reference data 312 for the sensor calibration control circuitry 118 can be defined by user inputs and stored in the database 310.

While an example manner of implementing the sensor calibration control circuitry 118 of FIGS. 1 and/or 2 is illustrated in FIG. 3, one or more of the elements, processes, and/or devices illustrated in FIG. 3 may be combined, divided, re-arranged, omitted, eliminated, and/or implemented in any other way. Further, the example switch control circuitry 300, the example power control circuitry 301, the example code generating circuitry 302, the example sensor communication analysis circuitry 304, the example timing circuitry 306 and/or, more generally, the example sensor calibration control circuitry 118 of FIGS. 1 and/or 2, may be implemented by hardware alone or by hardware in combination with software and/or firmware. Thus, for example, any of the switch control circuitry 300, the example power control circuitry 301, the example code generating circuitry 302, the example sensor communication analysis circuitry 304, the example timing circuitry 306 and/or, more generally, the example sensor calibration control circuitry 118, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example sensor calibration control circuitry 118 of FIGS. 1 and/or 2 may include one or more elements, processes, and/or devices in addition to, or instead of, those illustrated in FIG. 3, and/or may include more than one of any or all of the illustrated elements, processes, and devices.

Figure 4:
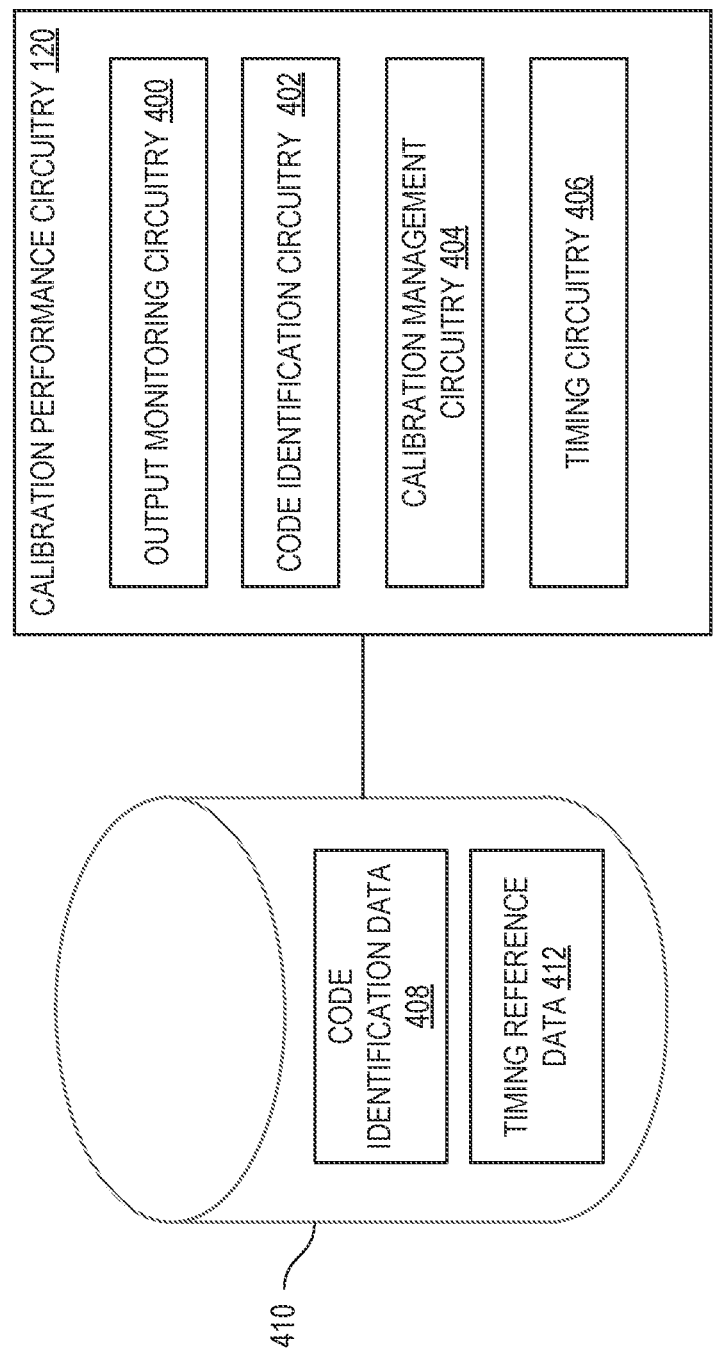
FIG. 4 is a block diagram of the example calibration performance circuitry of FIG. 1 in accordance with teachings of this disclosure.

FIG. 4 is a block diagram of the calibration performance circuitry 120 of FIGS. 1 and 2 to cause the sensor(s) 104 of FIGS. 1 and/or 2 of the vehicle 102 of FIG. 1 to perform a calibration in response to a command from the sensor calibration control circuitry 118 of the vehicle ECU 106. The calibration performance circuitry 120 of FIG. 4 may be instantiated (e.g., creating an instance of, bring into being for any length of time, materialize, implement, etc.) by processor circuitry such as a central processing unit executing instructions. Additionally or alternatively, the calibration performance circuitry 120 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

The example calibration performance circuitry 120 of FIG. 4 includes output monitoring circuitry 400, code identification circuitry 402, calibration management circuitry 404, and timing circuitry 406.

The output monitoring circuitry 400 of the example calibration performance circuitry 120 of the FIG. 4 detects or recognizes that the output 216 (e.g., an output line) of the sensor 104 has been grounded. For example, when the sensor 104 is powered on, the output monitoring circuitry 400 can check a voltage associated with the output 216. In other examples, the output monitoring circuitry 400 can detect a change in the voltage associated with the sensor 104 to a ground voltage during operation of the sensor 104.

When the output monitoring circuitry 400 detects that the output 206 is associated with a ground voltage, the code identification circuitry 402 monitors for a code or command from the sensor calibration control circuitry 118 indicating that a calibration should be performed. The code identification circuitry 402 recognizes the code from the sensor calibration control circuitry 118 based on code identification data 408 stored in a database 410. The code identification data 408 includes known code(s) associated with calibration command(s) for the sensor 104 (e.g., a code particular to one of the sensors 104, a common code for the sensors 104 to trigger the calibration). In some examples, the calibration performance circuitry 120 includes the database 410. In some examples, the database 410 is located external to the calibration performance circuitry 120 in a location accessible to the calibration performance circuitry 120 as shown in FIG. 4.

In response to the detection of the calibration command by the code identification circuitry 402, the calibration management circuitry 404 instructs the sensor 104 to perform the calibration (e.g., to collect and report measurements representing a property such as strain or pressure).

In examples in which the output monitoring circuitry 400 has detected that the output 216 is grounded, the timing circuitry 406 of the example calibration performance circuitry 120 monitors a time for detection of the calibration command by the code identification circuitry 402. If the timing circuitry 406 determines that the code identification circuitry 402 has not detected the calibration code from the sensor calibration control circuitry 118 within a threshold period of time, the calibration management circuitry 404 refrains from causing the sensor 104 to perform the calibration. In such instances, the calibration management circuitry 404 determines that the output 216 has been shorted to ground for a reason other than performance the calibration. The threshold time period can be defined by timing reference data 412. The timing reference data 412 can be defined by user inputs and stored in the database 410.

While an example manner of implementing the calibration performance circuitry 120 of FIGS. 1 and/or 2 is illustrated in FIG. 4, one or more of the elements, processes, and/or devices illustrated in FIG. 4 may be combined, divided, re-arranged, omitted, eliminated, and/or implemented in any other way. Further, the example output monitoring circuitry 400, the example code identification circuitry 402, the example calibration management circuitry 404, the example timing circuitry 406 and/or, more generally, the example calibration performance circuitry 120 of FIGS. 1 and/or 2, may be implemented by hardware alone or by hardware in combination with software and/or firmware. Thus, for example, any of the example output monitoring circuitry 400, the example code identification circuitry 402, the example calibration management circuitry 404, the example timing circuitry 406 and/or, more generally, the example calibration performance circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example calibration performance circuitry 120 of FIG. 1 or 2 may include one or more elements, processes, and/or devices in addition to, or instead of, those illustrated in FIG. 4, and/or may include more than one of any or all of the illustrated elements, processes, and devices.

Figure 5:
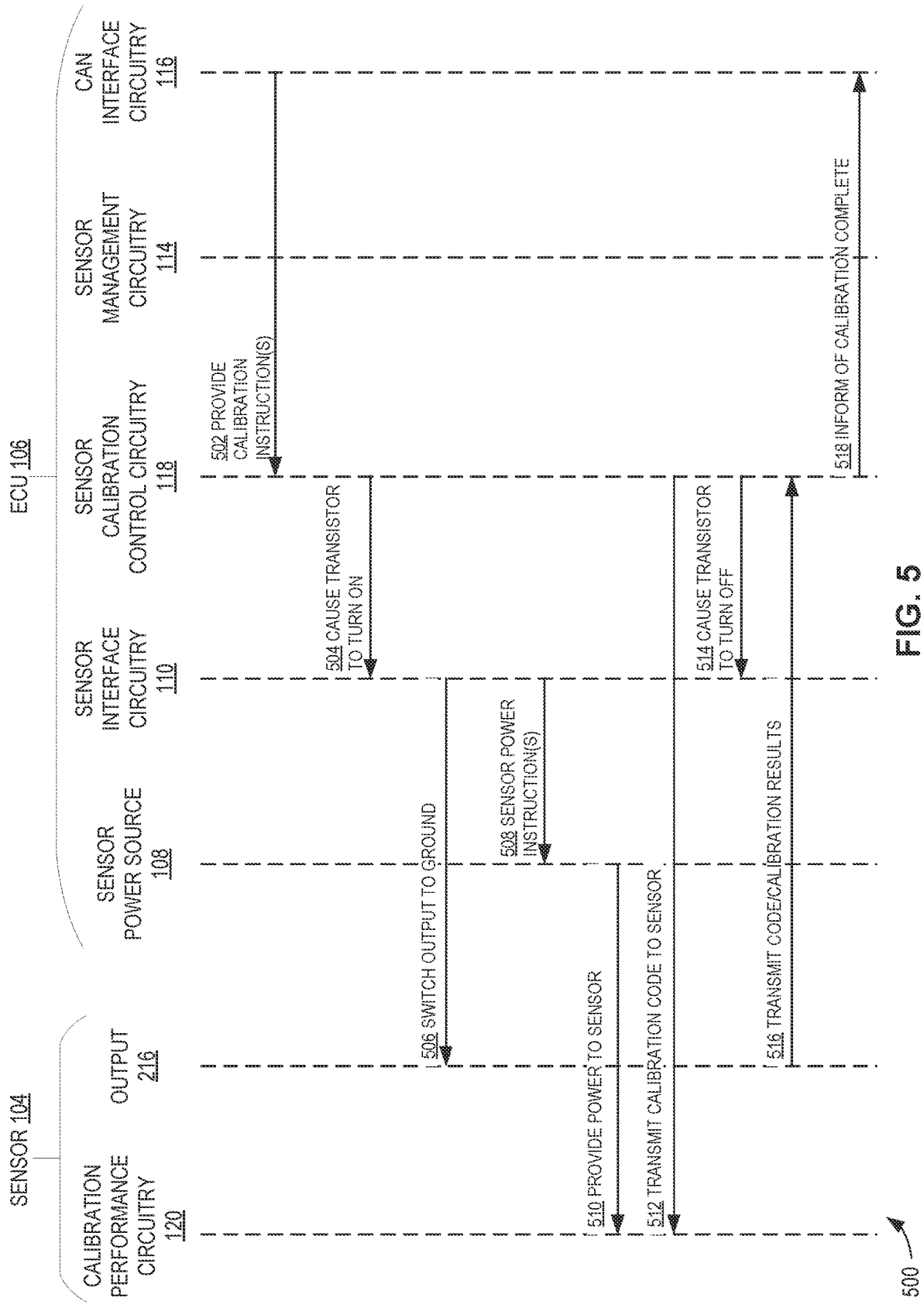
FIG. 5 is a communication flow diagram for the example system 100 of FIGS. 1 and 2.
Figure 6:
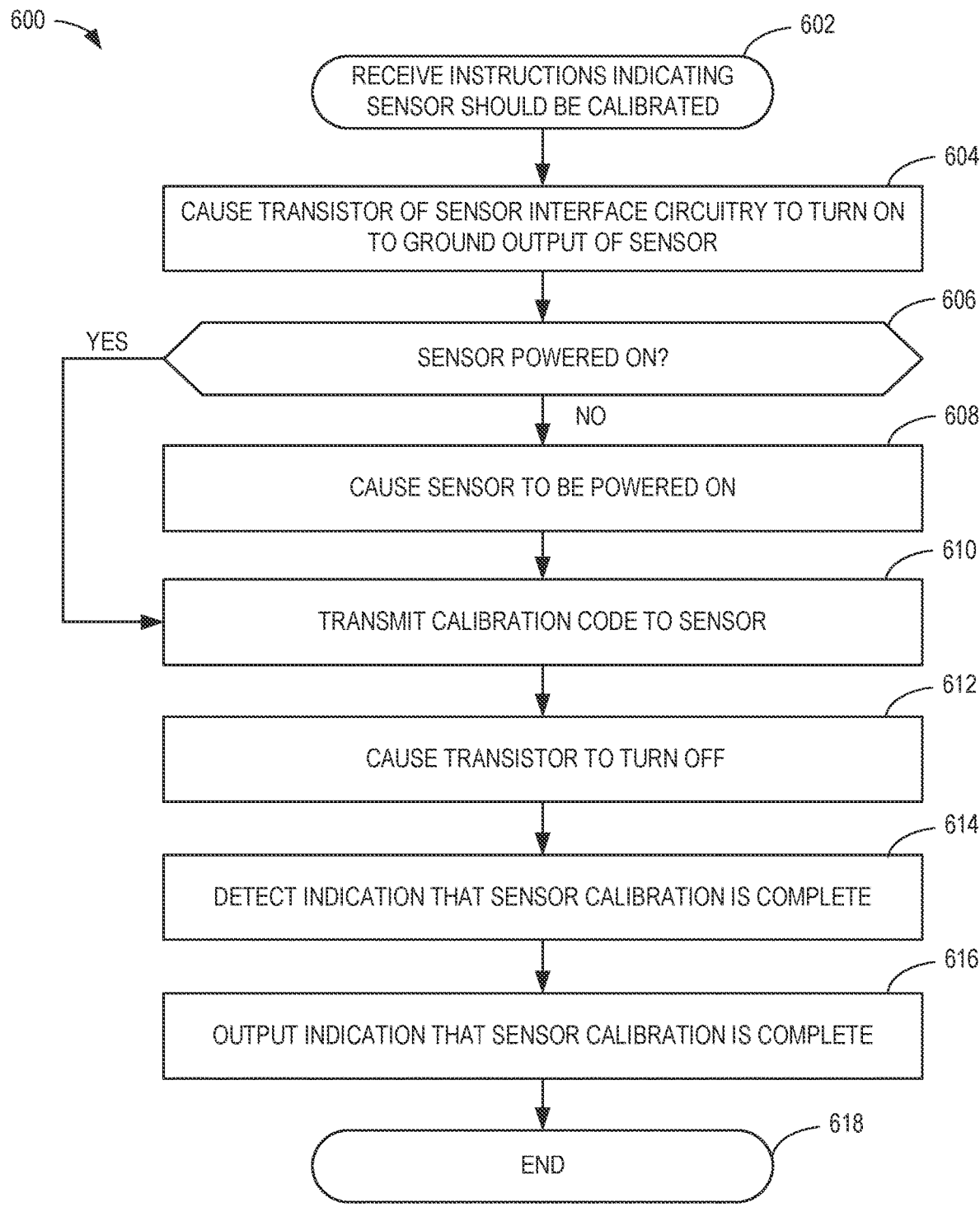
FIG. 6 is a flowchart representative of example machine readable instructions and/or example operations that may be executed by example processor circuitry to implement the sensor calibration control circuitry of FIG. 3.
Figure 7:
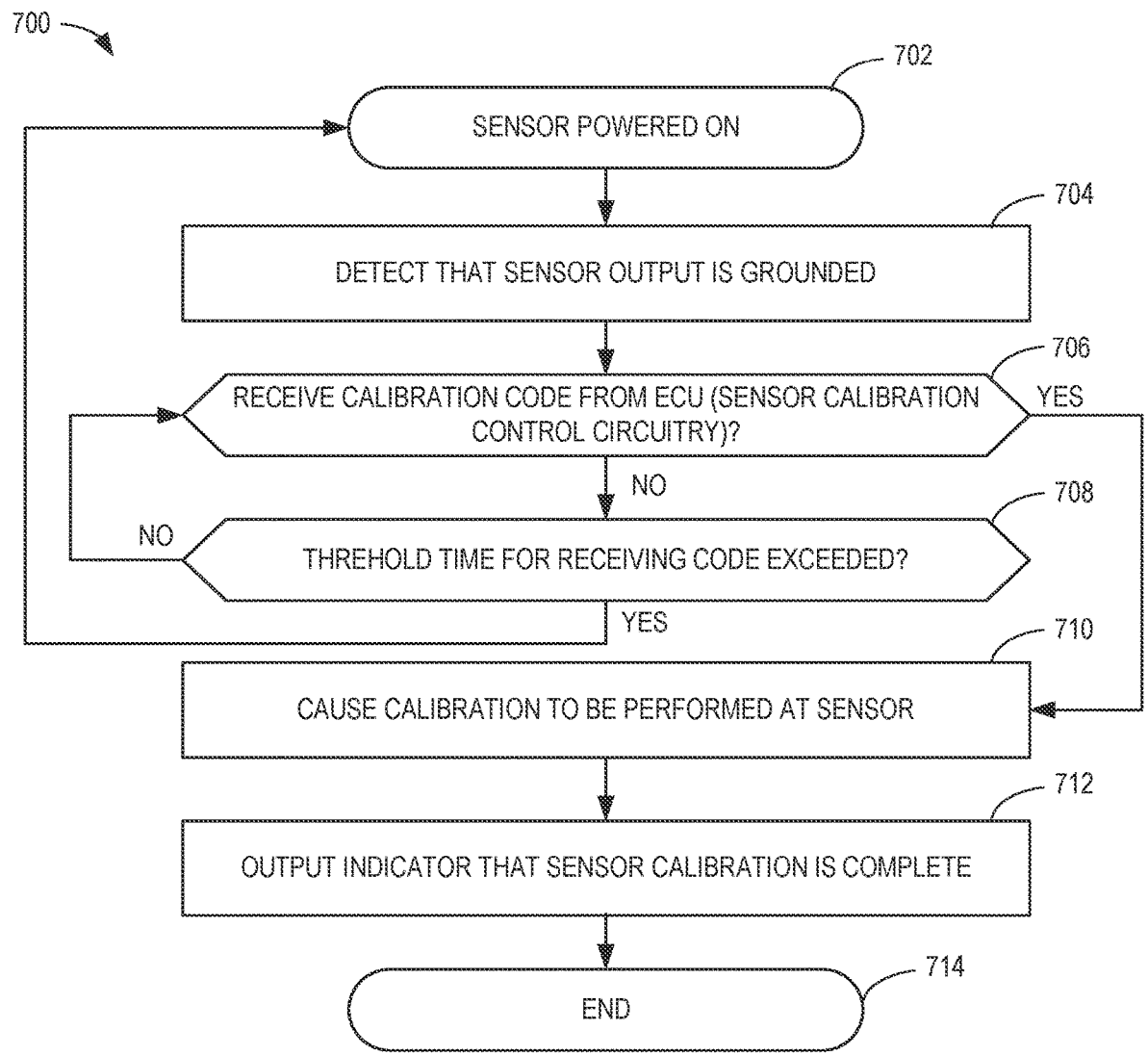
FIG. 7 is a flowchart representative of example machine readable instructions and/or example operations that may be executed by example processor circuitry to implement the calibration performance circuitry of FIG. 4.

A communication flow diagram including example signals associated with causing a sensor in a vehicle to perform a calibration is shown in FIG. 5. A flowchart representative of example machine readable instructions, which may be executed to configure processor circuitry to implement the sensor calibration control circuitry 118 of FIG. 3 is shown in FIG. 6. A flowchart representative of example machine readable instructions, which may be executed to configure processor circuitry to implement the calibration performance circuitry 120 of FIG. 4 is shown in FIG. 7. The machine readable instructions may be one or more executable programs or portion(s) of an executable program for execution by processor circuitry, such as the processor circuitry 812, 912 shown in the example processor platforms 800, 900 discussed below in connection with FIGS. 8 and 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to communication flow diagram illustrated in FIG. 5 and/or the flowcharts illustrated in FIGS. 6 and/or 7, many other methods of implementing the example sensor calibration control circuitry 118 and/or the calibration performance circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is communication flow diagram 500 for the example system 100 of FIGS. 1 and 2. The example diagram 500 of FIG. 5 represents signaling that occurs to cause the sensor 104 to perform a calibration after the sensor 104 is assembled in the vehicle 102 of FIG. 1 (e.g., after a strain sensor 104 is assembled to a suspension of the vehicle 102).

In the example of FIG. 5, the sensor management circuitry 114 or the CAN interface circuitry 116 transmit instructions to the sensor calibration control circuitry 118 indicating that calibration of the sensor 104 should be performed (signal 502). The sensor calibration control circuitry 118 (e.g., the switch control circuitry 300) transmits instructions to the transistor 224 of the sensor interface circuitry 110 to cause the transistor 224 to turn on and, thus, switch the output 216 (e.g., an output line) of the sensor 104 to ground (signals 504, 506). In the example of FIG. 5, the sensor calibration control circuitry 118 (e.g., the power control circuitry 301) transmits instructions to the sensor power source 108 to cause the sensor 104 to turn on (signal 508). The sensor power source 108 transmits a voltage to power on the sensor 104 (signal 510).

In the example of FIG. 5, the sensor calibration control circuitry 118 (e.g., the code generating circuitry 302) transmits a calibration code to the sensor 104 (signal 512). The calibration performance circuitry 120 (e.g., output monitoring circuitry 400) of the sensor 104 detects that the output 216 is shorted to ground. The calibration performance circuitry 120 (e.g., the code identification circuitry 402) detects the code and causes the calibration of the sensor 104 to be performed. The sensor calibration control circuitry 118 (e.g., the switch control circuitry 300) transmits instructions to cause the transistor 224 of the sensor interface circuitry 110 to turn off (signal 514). When the calibration is complete, the calibration performance circuitry 120 (e.g., the calibration management circuitry 404) causes a code and/or the results of the calibration to be transmitted the sensor calibration control circuitry 118 via the output 216 (signal 516). The sensor calibration control circuitry 118 can transmit instructions to, for example, the sensor management circuitry 114 and/or other ECUs 106 of the vehicle 102 via the CAN interface circuitry 116 to inform the sensor management circuitry 114 and/or other ECUs 106 that the calibration has been performed (signal 518).

FIG. 6 is a flowchart representative of example machine readable instructions and/or example operations 600 that may be executed and/or instantiated by processor circuitry to cause a sensor 104 to perform a calibration when assembled to the vehicle 102 of FIG. 1. The machine readable instructions and/or the operations 600 of FIG. 6 begin at block 602, at which the sensor calibration control circuitry 118 receives instructions via the CAN interface circuitry 116 or the sensor management circuitry 114 indicating that the sensor 104 should be calibrated.

At block 604, the switch control circuitry 300 of the example sensor calibration control circuitry 118 of FIG. 3 transmits instructions to cause the transistor 224 (or other type of switch) of the sensor interface circuitry 110 to turn on, close, or otherwise activate and, as a result, ground the output 216 (e.g., an output line) of the sensor 104. (As disclosed herein, other examples, the transistor 224 can cause the output 216 of the sensor 104 to switch to a positive voltage (e.g., 5 volts, 12 volts) different from the output voltage range of the sensor 104). At block 606, the power control circuitry 301 determines if the sensor 104 is powered on based on a state of the sensor power source 108. If the sensor 104 is not powered on, the power control circuitry 301 generates instructions to cause the sensor power source 108 to turn on the sensor 104 at block 608.

At block 610, the code generating circuitry 302 causes the calibration command or code to be transmitted to the sensor 104. In some examples, the code generating circuitry 302 selects a unique code from the reference code data 308 based on, for example, the type of sensor 104 to be calibrated. In some examples, the code generating circuitry 302 sends a common calibration code to the sensor 104.

At block 612, the switch control circuitry 300 generates instructions to cause the transistor 224 to turn off and, thus, cause signals transmitted via the output 216 of the sensor 104 to be processed by the low pass filter (e.g., the resistor 220, the capacitor 222) of the sensor interface circuitry 110. In some examples, the switch control circuitry 300 instructs the transistor 224 to turn off after a threshold period of time has passes as monitored by the timing circuitry 306. At block 614, the sensor communication analysis circuitry 304 detects that an indicator (e.g., a code, signals corresponding to measurement performed during the calibration) has been received from the sensor 104 indicating that the calibration is complete. At block 616, sensor communication analysis circuitry 304 outputs the indication that the sensor calibration is complete to, for instance, the sensor management circuitry 114 and/or other ECUs 106 of the vehicle 102 via the CAN interface circuitry 116. Control ends at block 618.

FIG. 7 is a flowchart representative of example machine readable instructions and/or example operations 700 that may be executed and/or instantiated by processor circuitry to cause the sensor 104 to perform a calibration when assembled to the vehicle 102 of FIG. 1. The machine readable instructions and/or the operations 700 of FIG. 7 begin at block 702, at which the sensor 104 is in a powered on state.

At block 704, the output monitoring circuitry 400 of the example calibration performance circuitry 120 of FIG. 4 detects that the output 216 (e.g., an output line) of the sensor 104 is grounded (or, in other examples, the that the output 216 has switched to a positive voltage different than the output voltage range of the sensor 104). At block 706, the code identification circuitry 402 determines if a calibration code has been received from the ECU 106 (i.e., the sensor calibration control circuitry 118) indicating that a calibration should be performed. The code identification circuitry 402 can interpret the code as a calibration command based on known code identification data 408 stored in the database 410.

In some examples, at block 708, the timing circuitry 406 determines that the code identification circuitry 402 has not received the code within a threshold period of time. In such examples, control returns to block 702 in which the sensor 104 remains powered on but does not (yet) perform the calibration until both conditions, namely, the output 216 being grounded and the calibration code being received, are satisfied.

When the code identification circuitry 402 detects the calculation code from the ECU 106, the calibration management circuitry 404 instructs the sensor 104 to perform the calibration at block 710. At block 712, the calibration management circuitry 404 causes an indicator that calibration is complete to be output to the ECU 106 of the vehicle 102. The indicator can include a code such as a Manchester code (e.g., the same code that was sent by the sensor calibration control circuitry 118 or a different code) and/or signals corresponding to measurements performed during the calibration.

Figure 8:
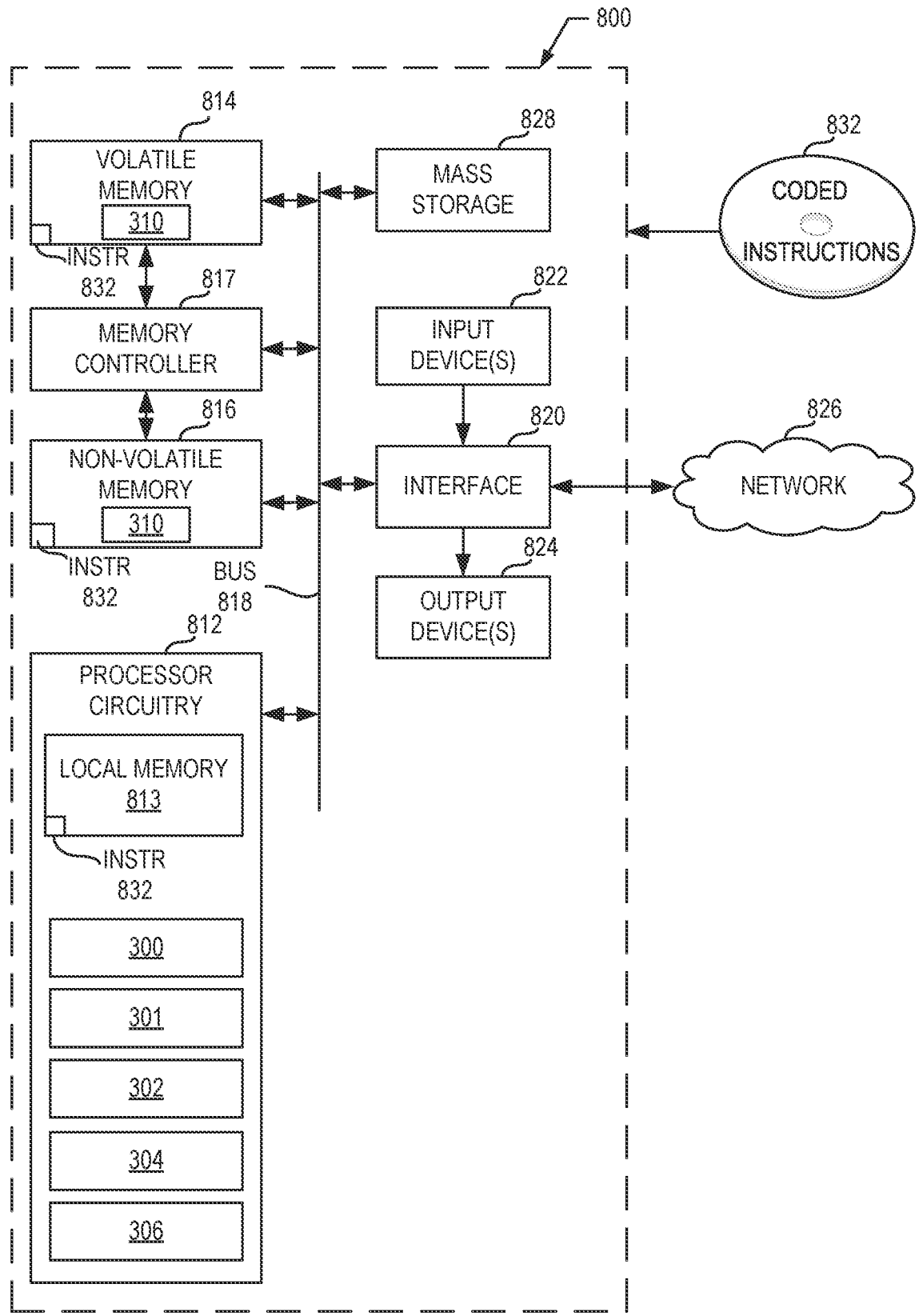
FIG. 8 is a block diagram of an example processing platform including processor circuitry structured to execute the example machine readable instructions and/or the example operations of FIG. 6 to implement the sensor calibration control circuitry of FIG. 3.

FIG. 8 is a block diagram of an example processor platform 800 structured to execute and/or instantiate the machine readable instructions and/or the operations of FIG. 6 to implement the sensor calibration control circuitry 118 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example switch control circuitry 300, the example power control circuitry 301, the example code generating circuitry 302, the example sensor communication analysis circuitry 304, and the example timing circuitry 306.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIG. 6, may be stored in the mass storage device 828, in the volatile memory 814, in the non-volatile memory 816, and/or on a removable non-transitory computer readable storage medium such as a CD or DVD.

Figure 9:
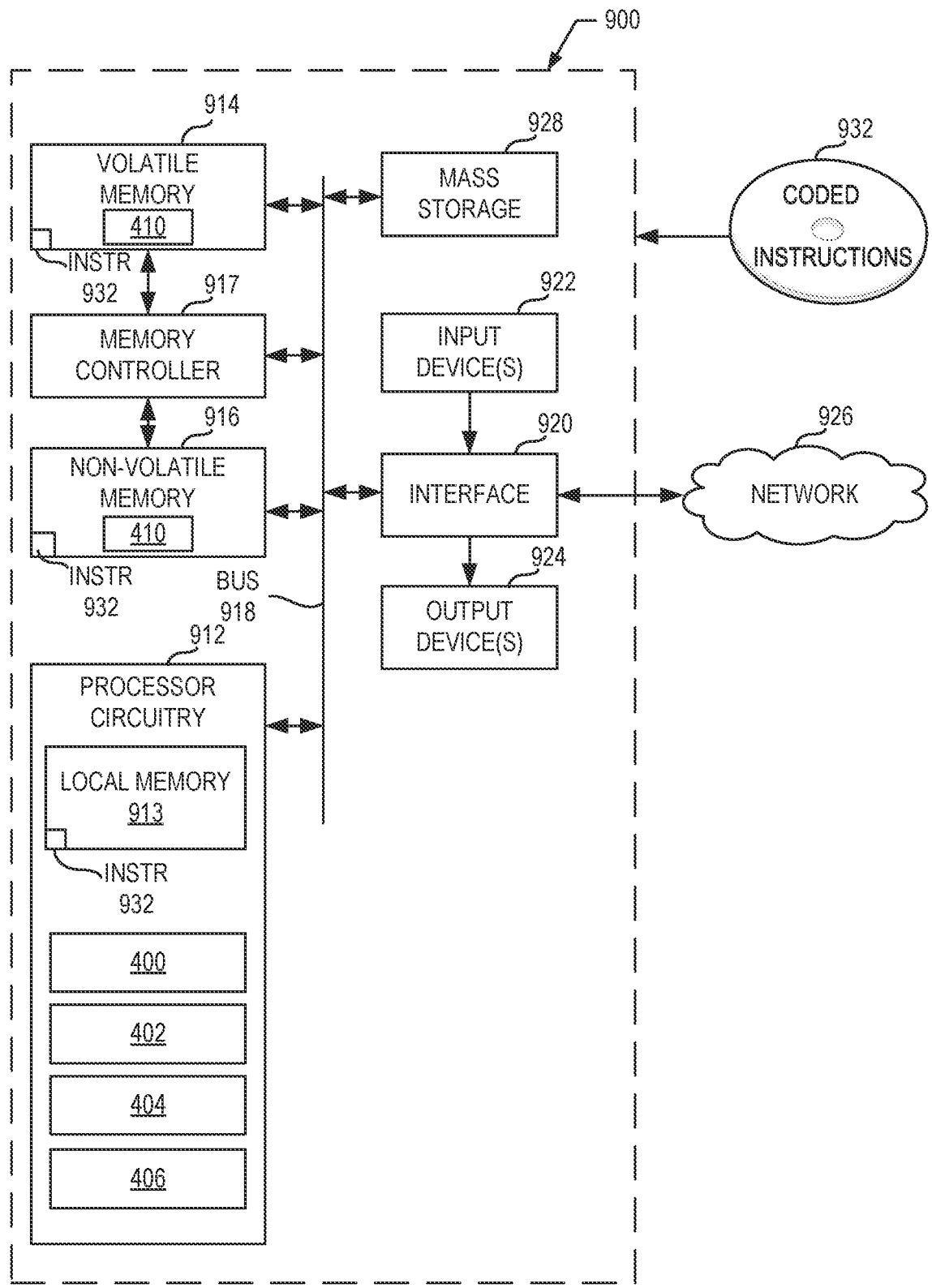
FIG. 9 is a block diagram of an example processing platform including processor circuitry structured to execute the example machine readable instructions and/or the example operations of FIG. 7 to implement the calibration performance circuitry of FIG. 4.

FIG. 9 is a block diagram of an example processor platform 900 structured to execute and/or instantiate the machine readable instructions and/or the operations of FIG. 7 to implement the calibration performance circuitry 120 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example output monitoring circuitry 400, the example code identification circuitry 402, the example calibration management circuitry 404, and the example timing circuitry 406.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIG. 7, may be stored in the mass storage device 928, in the volatile memory 914, in the non-volatile memory 916, and/or on a removable non-transitory computer readable storage medium such as a CD or DVD.

Figure 10:
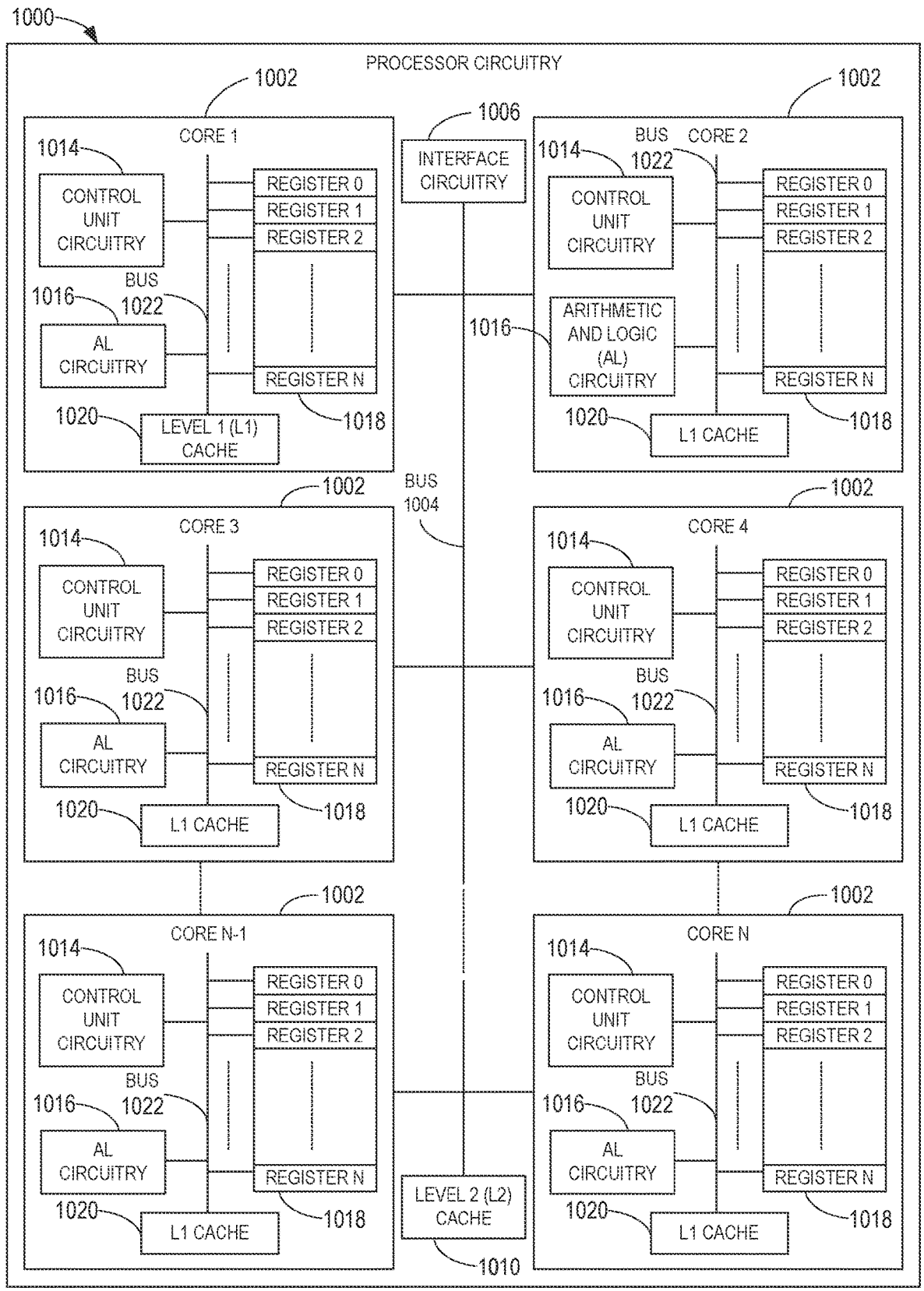
FIG. 10 is a block diagram of an example implementation of the processor circuitry of FIGS. 8 and/or 9.

FIG. 10 is a block diagram of an example implementation of the processor circuitry 812 of FIG. 8 and/or the processor circuitry 912 of FIG. 9. In this example, the processor circuitry 812 of FIG. 8 and/or the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 6 and/or 7 to effectively instantiate the circuitry of FIGS. 3 and/or 4 as logic circuits to perform the operations corresponding to those machine readable instructions. In some such examples, the circuitry of FIGS. 3 and/or 4 is instantiated by the hardware circuits of microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6 and/or 7.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 814, 816 of FIG. 8; the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
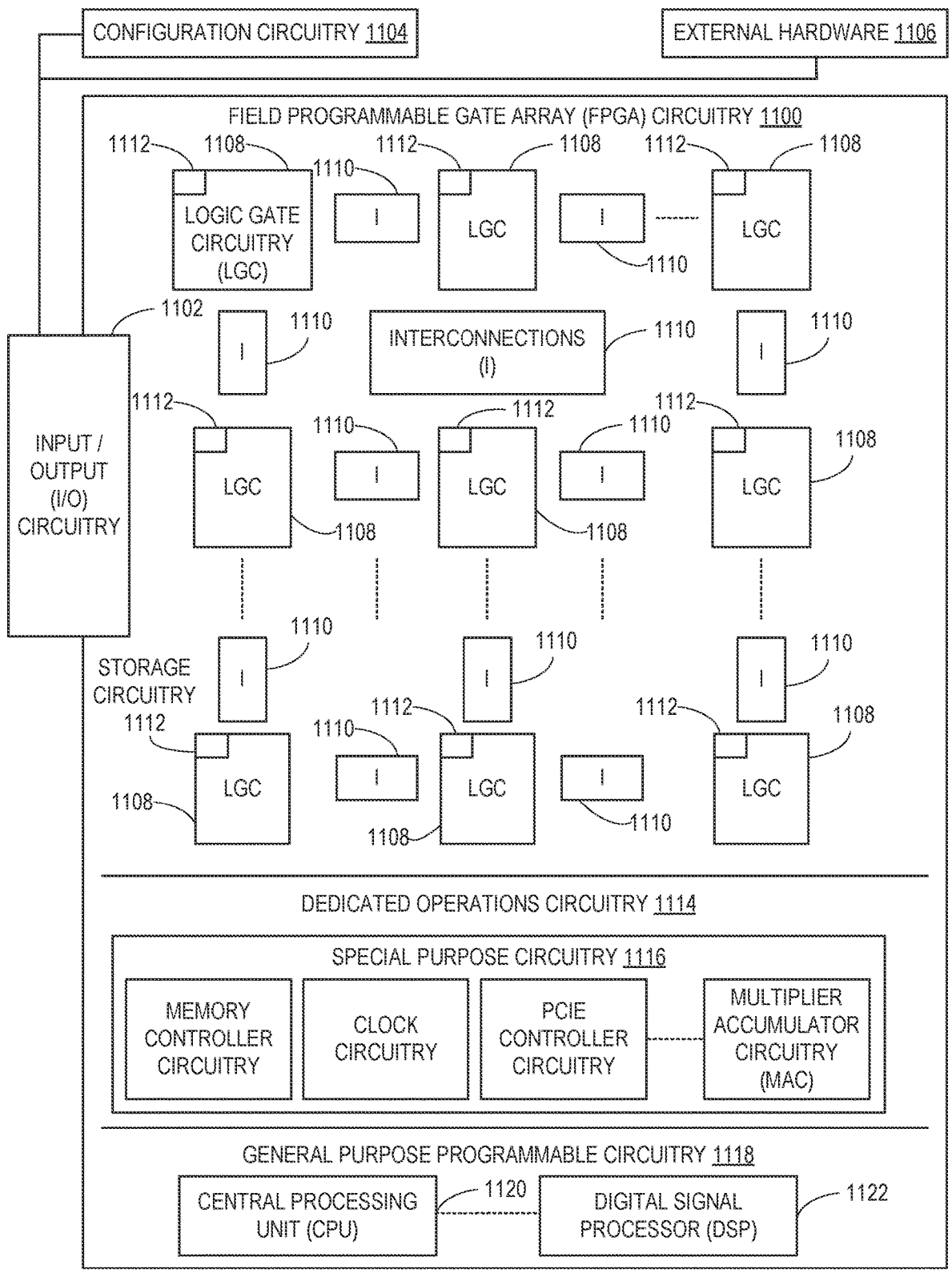
FIG. 11 is a block diagram of another example implementation of the processor circuitry of FIGS. 8 and/or 9.

FIG. 11 is a block diagram of another example implementation of the processor circuitry 812 of FIG. 8 and/or the processor circuitry 912 of FIG. 9. In this example, the processor circuitry 812 of FIG. 8 and/or the processor circuitry 912 of FIG. 9 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 6 and/or 7 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 6 and/or 7. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 6 and/or 7. As such, the FPGA circuitry 1100 may be structured to effectively instantiate some or all of the machine readable instructions of the flowcharts of FIGS. 6 and/or 7 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 6 and/or 7 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 6 and/or 7 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 812 of FIG. 8 and/or the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 812 of FIG. 8 and/or the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 6 and/or 7 may be executed by one or more of the cores 1002 of FIG. 10, a second portion of the machine readable instructions represented by the flowcharts of FIGS. 6 and/or 7 may be executed by the FPGA circuitry 1100 of FIG. 11, and/or a third portion of the machine readable instructions represented by the flowcharts of FIGS. 6 and/or 7 may be executed by an ASIC. It should be understood that some or all of the circuitry of FIGS. 3 and/or 4 may, thus, be instantiated at the same or different times. Some or all of the circuitry may be instantiated, for example, in one or more threads executing concurrently and/or in series. Moreover, in some examples, some or all of the circuitry of FIGS. 3 and/or 4 may be implemented within one or more virtual machines and/or containers executing on the microprocessor.

In some examples, the processor circuitry 812 of FIG. 8 and/or the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 812 of FIG. 8 and/or the processor circuitry 912 of FIG. 9, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that provide for calibration of a sensor assembled in a vehicle. Example sensor interfaces disclosed herein include a transistor or other type of switch that is selectively activated to affect (e.g., ground) an output (e.g., a line, a wire) of the sensor. Examples disclosed herein transmit a calibration command to the sensor when the transistor is activated. The sensor detects changes at the output (e.g., a ground voltage) and identifies the calibration command. In response, the sensor performs the calibration. Examples disclosed herein use existing communication channels between the electronic control unit (ECU) of the vehicle and the sensor to initiate calibration of the sensor without substantially increasing complexity of the sensor output interface.

Example systems, apparatus, and related methods for vehicle sensor calibration are disclosed herein. Further examples and combinations thereof include the following:

Example 1 includes a vehicle comprising a sensor including an output; sensor interface circuitry including a transistor, the sensor interface circuitry communicatively coupled to the output; and processor circuitry communicatively coupled to the sensor via the sensor interface circuitry, the processor circuitry to cause the transistor to activate to electrically couple the output to one of (a) a ground potential or (b) a voltage source associated with a voltage different than a voltage corresponding to an output voltage range of the sensor; and cause a code to be transmitted to the sensor, the sensor to perform a calibration in response to the electrical coupling of the output to ground and receipt of the code.

Example 2 includes the vehicle of example 1, wherein the sensor is in a powered-off state prior the activation of the transistor, the processor circuitry to cause power to be provided to the sensor after the transistor has been activated.

Example 3 includes the vehicle of examples 1 or 2, wherein the code is to be transmitted to the sensor via the output.

Example 4 includes the vehicle of any of examples 1-3, wherein the processor circuitry is to cause the transistor to deactivate after the transmission of the code.

Example 5 includes the vehicle of any of examples 1-4, wherein the code is a first code and the sensor is to cause a second code to be transmitted via the output after the calibration has been performed, the processor circuitry to access the second code via the sensor interface circuitry.

Example 6 includes the vehicle of any of examples 1-5, wherein the sensor is a first sensor, the code is a first code, and the processor circuitry is to cause the transistor to activate to electrically couple an output of a second sensor to ground; and cause a second code to be transmitted to the second sensor, the second sensor to perform a calibration in response to connection of the output of the second sensor to ground and receipt of the second code.

Example 7 includes the vehicle of any of examples 1-6, wherein the second code is different than the first code.

Example 8 includes an apparatus to cause a sensor to perform a calibration, the apparatus comprising sensor interface circuitry communicatively coupled to the sensor via an output of the sensor; at least one memory; machine readable instructions; and processor circuitry to at least one of instantiate or execute the machine readable instructions to cause the output of the sensor to electrically connect to a first voltage, the first voltage having a value outside of an output voltage range of the sensor; cause a calibration command to be transmitted to the sensor via the sensor interface circuitry; and verify that the calibration has been performed in response to a signal from the sensor.

Example 9 includes the apparatus of example 8, wherein the sensor interface circuitry includes a switch and the processor circuitry is to cause the output to electrically connect to ground by causing the switch to activate.

Example 10 includes the apparatus of examples 8 or 9, wherein the processor circuitry is to cause the switch to deactivate after causing the calibration command to be transmitted to the sensor.

Example 11 includes the apparatus of any of examples 8-10, wherein the sensor interface circuitry includes a low pass filter, the processor circuitry to access the signal from the sensor via the low pass filter when the switch is deactivated.

Example 12 includes the apparatus of any of examples 8-11, wherein the voltage corresponds to a ground voltage.

Example 13 includes the apparatus of any of examples 8-12, wherein the processor circuitry is to instruct a power source to provide power to the sensor when the output of the sensor is electrically connected to the ground voltage.

Example 14 includes the apparatus of any of examples 8-13, wherein the calibration command includes a Manchester code.

Example 15 includes a system comprising sensor calibration control circuitry to cause an output of a sensor to electrically couple to a first voltage different than a voltage defining an output sensor range of the sensor; cause a first code to be transmitted to the sensor; and calibration performance circuitry to detect the first voltage of the output; identify the first code; and in response to the detection of the first voltage of the output and the identification of the first code, cause a calibration to be performed at the sensor.

Example 16 includes the system of example 15, wherein the sensor calibration control circuitry is in communication with an electronic control unit of a vehicle.

Example 17 includes the system of examples 15 or 16, wherein the calibration performance circuitry is to cause a second code to be output in response to completion of the calibration at the sensor.

Example 18 includes the system of any of examples 15-17, wherein the second code includes at least one of (a) the first code or (b) a signal indicative of a measurement obtained by the sensor during the calibration.

Example 19 includes the system of any of examples 15-18, wherein the first voltage is a ground voltage, the sensor calibration control circuitry is to cause the output of the sensor to be grounded by activating a transistor, the transistor communicatively coupled to the output when the transistor is activated.

Example 20 includes the system of any of examples 15-19, wherein the sensor calibration control circuitry is to cause the sensor to change from a powered-off state to a powered-on state after causing the output to electrically couple to the first voltage.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A vehicle comprising:
   a sensor including an output;
   sensor interface circuitry including a transistor, the sensor interface circuitry communicatively coupled to the output; and
   machine readable instructions;
   processor circuitry communicatively coupled to the sensor via the sensor interface circuitry, the processor circuitry to at least one of instantiate or execute the machine readable instructions to:
   cause the transistor to activate and electrically couple the output to one of (a) a ground potential or (b) a voltage source associated with a voltage different than a voltage corresponding to an output voltage range of the sensor; and
   cause a code to be transmitted to the sensor, the sensor to perform a calibration in response to the electrical coupling of the output to the ground potential or the voltage source and receipt of the code.

2. The vehicle of claim 1, wherein the sensor is in a powered-off state prior the activation of the transistor, the processor circuitry to cause power to be provided to the sensor after the transistor has been activated.

3. The vehicle of claim 1, wherein the code is to be transmitted to the sensor via the output.

4. The vehicle of claim 1, wherein the processor circuitry is to cause the transistor to deactivate after the transmission of the code.

5. The vehicle of claim 1, wherein the code is a first code and the sensor is to cause a second code to be transmitted via the output after the calibration has been performed, the processor circuitry to access the second code via the sensor interface circuitry.

6. The vehicle of claim 1, wherein the sensor is a first sensor, the code is a first code, the transistor is activated a first time, and the processor circuitry is to:
   cause the transistor to turn off after a first period of time;
   cause the transistor to activate at a second time after the first period of time and electrically couple an output of a second sensor to ground; and
   cause a second code to be transmitted to the second sensor, the second sensor to perform a calibration in response to connection of the output of the second sensor to ground and receipt of the second code.

7. The vehicle of claim 6, wherein the second code is different than the first code.

8. An apparatus to cause a sensor to perform a calibration, the apparatus comprising:
   sensor interface circuitry communicatively coupled to the sensor via an output of the sensor;
   at least one memory;
   machine readable instructions; and
   processor circuitry to at least one of instantiate or execute the machine readable instructions to:
   cause the output of the sensor to electrically connect to a first voltage, the first voltage having a value outside of an output voltage range of the sensor;
   cause a calibration command to be transmitted to the sensor via the sensor interface circuitry; and
   verify that the calibration has been performed in response to a signal from the sensor.

9. The apparatus of claim 8, wherein the sensor interface circuitry includes a switch and the processor circuitry is to cause the output to electrically connect to ground by causing the switch to activate.

10. The apparatus of claim 9, wherein the processor circuitry is to cause the switch to deactivate after causing the calibration command to be transmitted to the sensor.

11. The apparatus of claim 10, wherein the sensor interface circuitry includes a low pass filter, the processor circuitry to access the signal from the sensor via the low pass filter when the switch is deactivated.

12. The apparatus of claim 9, wherein the calibration command includes a Manchester code.

13. The apparatus of claim 8, wherein the first voltage corresponds to a ground voltage.

14. The apparatus of claim 13, wherein the processor circuitry is to instruct a power source to provide power to the sensor when the output of the sensor is electrically connected to the ground voltage.

15. A system comprising:
sensor calibration control circuitry to:
cause an output of a sensor to electrically couple to a first voltage different than a voltage defining an output sensor range of the sensor;
cause a first code to be transmitted to the sensor; and
calibration performance circuitry to:
detect the first voltage of the output;
identify the first code; and
in response to the detection of the first voltage of the output and the identification of the first code, cause a calibration to be performed at the sensor.

16. The system of claim 15, wherein the sensor calibration control circuitry is in communication with an electronic control unit of a vehicle.

17. The system of claim 15, wherein the calibration performance circuitry is to cause a second code to be output in response to completion of the calibration at the sensor.

18. The system of claim 17, wherein the second code includes at least one of (a) the first code or (b) a signal indicative of a measurement obtained by the sensor during the calibration.

19. The system of claim 15, wherein the first voltage is a ground voltage, the sensor calibration control circuitry is to cause the output of the sensor to be grounded by activating a transistor, the transistor communicatively coupled to the output when the transistor is activated.

20. The system of claim 15, wherein the sensor calibration control circuitry is to cause the sensor to change from a powered-off state to a powered-on state after causing the output to electrically couple to the first voltage.

* * * * *